United States Patent [19]

Hayashi et al.

[11] Patent Number: 5,273,822
[45] Date of Patent: Dec. 28, 1993

[54] FIBROUS ELECTRICALLY-CONDUCTIVE FILLER AND PROCESS FOR PRODUCING THE SAME

[75] Inventors: Takao Hayashi; Norihiro Sato; Chikara Omotani, all of Yamaguchi; Manabu Hosoi; Nobuyoshi Kasahara, both of Saitama, all of Japan; Wolf-Dieter Griebler, Moers, Fed. Rep. of Germany; Jörg Hocken, Düsseldorf, Fed. Rep. of Germany; Günther Rudolph, Neuberg, Fed. Rep. of Germany

[73] Assignees: Mitsui Mining & Smelting Co., Ltd., Tokyo, Japan; Metallgesellschaft Aktiengesellschaft, Fed. Rep. of Germany

[21] Appl. No.: 798,102

[22] Filed: Nov. 26, 1991

[30] Foreign Application Priority Data

Mar. 29, 1991 [JP] Japan .................................. 3-089227

[51] Int. Cl.⁵ .......................... B05D 3/02; B32B 9/00
[52] U.S. Cl. ..................................... 428/389; 428/433; 428/934; 428/226; 428/902; 428/373; 428/374; 428/375; 427/443.2; 427/126.3
[58] Field of Search .............. 428/373, 374, 375, 389, 428/379, 384, 403, 404, 11, 433, 934, 226, 902; 427/443.2, 126.3

[56] References Cited

PUBLICATIONS

Abstract of JP-A 59-102820.
Abstract of JP-A 62-59528.
English translation of claim 1 of Japanese Unexamined Patent Publication No. Sho 62-122005.

*Primary Examiner*—Patrick J. Ryan
*Assistant Examiner*—Richard P. Wesley
*Attorney, Agent, or Firm*—Sughrue, Mion, Zinn, Macpeak & Seas

[57] ABSTRACT

A fibrous electrically-conductive filler comprises fibrous aluminum borate as a core material and a layer of a electrically-conductive substance which covers the core material or comprises fibrous aluminum borate as a core material, a layer of titanium oxide which covers the fibrous aluminum borate and a layer of a electrically-conductive substance which covers the titanium oxide layer. The fibrous electrically-conductive filler can be prepared by a process comprising the step of directly forming a layer of a electrically-conductive substance doped with antimony or fluorine on the surface of fibrous aluminum borate, or the steps of forming, on the surface of the fibrous aluminum borate, an intermediate layer of titanium oxide in an amount ranging from 2 to 50% by weight on the basis of the weight of the fibrous aluminum borate and then forming a layer of a electrically-conductive substance doped with antimony or fluorine on the surface of fibrous aluminum borate. The filler has a low volume specific resistivity and is substantially excellent in electrical conductivity-imparting effect per unit weight thereof when it is added to a basic material such as a resin. The electrically-conductive substance coated on the filler surface is not peeled off and hence the filler does not cause loss of the electrical conductivity when it is incorporated into a basic material such as paper, a plastic, a rubber, a resin or a paint. The filler per se is white or transparent and, therefore, the color tone of such a basic material may be arbitrarily changed by the addition of a coloring agent.

8 Claims, No Drawings

FIBROUS ELECTRICALLY-CONDUCTIVE FILLER AND PROCESS FOR PRODUCING THE SAME

BACKGROUND OF THE INVENTION (a) Field of the Invention

The present invention relates to a fibrous electrically-conductive filler and a process for producing the filler and more specifically to a fibrous electrically-conductive filler which is admixed with a substance such as papers, plastics, rubbers, resins or paints to impart electrical conductivity thereto and which has a low volume specific resistivity and an excellent electrical conductivity-imparting effect per unit weight thereof, as well as a process for producing the same.

(b) Description of the Prior Art

There have been known various fine substances which can be added to, for instance, plastics and paints to impart electrical conductivity thereto, for instance, such as tin oxide powder doped with antimony, zinc oxide powder doped with aluminum, or powder, for instance, titanium oxide or aluminum oxide covered with tin oxide as well as fibrous substances, for instance, glass fibers, fibers of alkali metal titanates and titanium oxide fibers covered with tin oxide.

As has been well-known, electrically-conductive fine substances must come in contact with one another in a substance to which they are added for imparting excellent electrical conductivity to the substances such as plastics and paints. For this reason, it is necessary to add a great deal of powder to these materials if electrically-conductive spherical powder is employed. Thus, products obtained by admixing expensive electrically-conductive powder to materials are limited in their applications because of the production cost thereof.

To eliminate this problem, there have been proposed the aforementioned fibrous substances having an aspect ratio substantially greater than that for the spherical powder and a shape which makes it possible to increase the probability of contact between the conductibity-imparting substances even in a relatively small added amount. For instance, Japanese Unexamined Patent Publication (hereinafter referred to as "J.P. KOKAI") Nos. Sho 59-102820 and Sho 62-59528 disclose electrically-conductive alkali metal titanate fibers comprising alkali metal titanate fibers represented by the general formula: $M_2O \cdot nTiO_2 \cdot mH_2O$ coated with tin oxide substance as well as a process for producing the same. In addition, J.P. KOKAI No. Sho 62-122005 discloses a process for producing a white fibrous electrically-conductive filler, the process comprising liquating out alkaline compoments which adversely affect electrical conductivity through a preliminary treatment of alkali metal titanate fibers with an acid and then coating the fibers with a tin oxide substance.

As compared with electrically-conductive fibers obtained by coating glass fibers with a electrically-conductive substance, if these conventional fibrous electrically-conductive alkali metal titanate fillers are admixed with a substance such as a plastic, a rubber or a paint, only a small amount of the fibrous substance is peeled off from the electrically-conductive material the electrical conductivity-imparting effect thereof is only slightly decreased. However, the alkali metal titanate fibers per se have a relatively low resistance to acids and this, in turn, lead to various problems. For instance, the alkali components thereof liquate out due to the action of an acid in coating the fibers with a electrically-conductive substance, the fibers are easily broken, the diameter thereof is reduced, they become porous and correspondingly the surface area thereof is undesirably increased. For this reason, it is required to use a large amount of a electrically-conductive substance for forming a electrically-conductive layer having the same thickness as that for the conventional fillers.

Moreover, the electrical conductivity of products obtained by incorporating a electrically-conductive filler is in general dependent upon the amount of the electrically-conductive filler (volume %) and thus, the smaller the specific gravity of a electrically-conductive filler the smaller the amount of the filler to be incorporated. In this respect, however, the foregoing alkali metal titanate fibers are not always sufficient.

SUMMARY OF THE INVENTION

Accordingly, an object of the present invention is to provide a fibrous electrically-conductive filler which can eliminate the foregoing problems associated with the conventional such fillers.

More specifically, an object of the present invention is to provide a fibrous electrically-conductive filler which has a low volume specific resistivity and is substantially excellent in electrical conductivity-imparting effect per unit weight thereof (i.e., even in a small added amount) when it is added to a basic material such as a resin.

Another object of the present invention is to provide a fibrous electrically-conductive filler whose electrically-conductive substance coated on the filler surface is not peeled off and which hence does not cause loss of the electrical conductivity of the filler when it is incorporated into a basic material such as a paper, a plastic, a rubber, a resin or a paint.

A further object of the present invention is to provide a electrically-conductive filler which is white or transparent in itself and, therefore, the color tone of a basic material such as paper, a plastic, a rubber, a resin or a paint may be arbitrarily changed by the addition of a coloring agent even if the basic material comprises the electrically-conductive filler.

The inventors of this invention have conducted intensive studies to achieve the foregoing objects, have found out that it is effective to use fibrous aluminum borate as a core material because of high strength, elastic modulus, heat resistance and resistance to acids as well as a low true specific gravity in comparison with those for alkali metal titanate fibers and thus have completed the present invention.

According to an aspect of the present invention, there is provided a light fibrous electrically-conductive filler having excellent electrical conductivity which comprises fibrous aluminum borate and a layer of a electrically-conductive substance covering the fibrous aluminum borate, or comprises fibrous aluminum borate, a layer of titanium oxide covering the fibrous aluminum borate and a layer of a electrically-conductive substance covering the titanium oxide layer.

According to another aspect of the present invention, there is also provided a process for producing a fibrous electrically-conductive filler which comprises the step of forming a electrically-conductive layer of tin oxide doped with antimony or fluorine on the surface of fibrous aluminum borate, or comprises the steps of forming a layer of titanium oxide on the surface of fibrous aluminum borate in an amount of 2 to 50% by weight on the basis of the weight of the fibrous aluminum borate and then forming a electrically-conductive layer of tin oxide doped with antimony or fluorine on the surface of the titanium oxide layer.

The fibrous electrically-conductive filler of the present invention has a low volume specific resistivity, excellent electrical conductivity-imparting effect per unit weight upon incorporating it into a basic material such as a resin or a paint. Further, it is white or transparent in itself and, therefore, products having any color tone may be prepared by simultaneous addition of the fibrous electrically-conductive filler and a coloring material, the products have high quality and no toxicity and the fibrous electrically-conductive filler is not expensive.

DESCRIPTION OF THE PREFERRED EMBODIMENTS

The fibrous electrically-conductive filler and the process according to the present invention will hereinafter be explaimed in more detail.

The fibrous aluminum borate as used herein may be any aluminum borate so long as it is in the fibrous form, but preferably those having an average fiber length ranging from 10 to 30 μm and an average fiber diameter ranging from 0.5 to 1 μm as determined by microscopic observation and a chemical composition represented by the following formula: $9Al_2O_3 \cdot 2B_2O_3$ or $2Al_2O_3 \cdot B_2O_3$. An example such a fibrous aluminum borate is commercially available from Shikoku Chemicals Corp. under the trade name of Alborex G.

When the fibrous aluminum borate is coated with a electrically-conductive substance such as a electrically-conductive metal compound in the present invention, a layer of the electrically-conductive substance can directly be applied onto the surface of the fibrous aluminum borate to give a fibrous electrically-conductive filler of the invention having excellent electrical conductivity, but more preferably a layer of titanium oxide is first formed on the surface of the fibrous aluminum borate and then a electrically-conductive substance is applied onto the titanium oxide layer to give a electrically-conductive layer thereon.

The titanium oxide layer can easily be formed by hydrolyzing, under heating, a solution of titanyl sulfate or titanium tetrachloride in the presence of the fibrous aluminum borate. The amount of the titanium oxide layer to be applied preferably ranges from 2 to 50% by weight on the basis of the weight of the fibrous aluminum borate The resulting titanium oxide layer is calcined at a temperature ranging from 150° to 900° C. The calcination is performed to form a uniform titanium oxide film having a uniform rutile type crystalline structure on the fibrous aluminum borate Thereafter, a tin oxide substance (doped with antimony or fluorine) is coated thereon Thus, a uniform and strong film can be formed since the crystalline structure of the coating film of the electrically-conductive substance is identical with that Obtained from titanium oxide as an intermediate layer. As a result, the resulting electrically-conductive filler not only has excellent electrical conductivity, but also, upon incorporating it into a basic material, does not cause peeling off of the electrically-conductive film applied onto the electrically-conductive filler to thus cause reduction of electrical conductivity. Further, there is not observed any reduction in the electrical conductivity due to the diffusion of Al, B components into the electrically-conductive layer because of the presence of the uniform intermediate layer. Further, the filler is white and accordingly shows an opacifying effect because of the presence of the titanium oxide layer having a high refractive index.

In the present invention, the amount of the titanium oxide to be applied preferably ranges from 2 to 50% by weight. In this respect, the fibrous aluminum borate is covered therewith in a relatively small amount if a transparent filler is desired, while it is covered with a large amount of titanium oxide if a white filler is desired. If the coated amount of titanium oxide is less than 2% by weight, it is difficult to uniformly cover the surface of the fibrous aluminum borate with titanium oxide. On the other hand, the use thereof in an amount of more than 50% by weight leads to the presence of free titanium oxide in the resulting filler and an increase in the true specific gravity thereof.

Subsequently, the fibrous aluminum borate coated with titanium oxide is dispersed in water to apply a electrically-conductive substance thereto. In this respect, it is recomendable to use, as the electrically-conductive substance, a tin oxide compound (doped with antimony or fluorine). The use of antimony as a dopant is preferred because of easy handling properties and high fixing rate thereof.

Any process can be used for coating the titanium oxide-coated fibrous aluminum borate with the tin oxide compound, but the following processss are recomendable by way of preferred examples: the processss comprise the steps of (1) gradually adding an ethanol solution containing a desired amount of tin(IV) chloride and antimony chloride to a slurry obtained by dispersing the titanium oxide-coated fibrous aluminum borate in water maintained at 60 to 80 to hydrolyze them and precipitate a tin oxide compound doped with antimony to thus form a coating film on the fibrous aluminum borate, filtering the slurry, washing, drying and then calcining the product; (2) simultaneously adding an aqueous solution containing a desired amount of tin(IV) chloride and antimony chloride and an aqueous solution of an alkali to a slurry obtained by dispersing the titanium oxide-coated fibrous aluminum borate in water maintained at 60° to 80° C., while maintaining the pH of the slurry to 2 to 5 to thus precipitate a tin oxide compound doped with antimony and to hence form a coating film on the fibrous aluminum borate, filtering the slurry, washing, drying and then calcining the product; or (3) adding a solution of an alkali metal stannate to a slurry obtained by dispersing the titanium oxide-coated fibrous aluminum borate in water maintained at 60° to 80° C., gradually lowering the pH of the slurry to 1.5 to 3.0 by the addition of a dilute sulfuric acid solution to thus precipitate a tin compound and to hence form a coating film on the fibrous aluminum borate, then simultaneously and gradually adding an antimony chloride solution and an alkaline solution to the slurry while maintaining the pH thereof to 1.5 to 3.0 to thus precipitate an antimony compound and to hence give a film thereon, filtering the slurry, washing, drying and then calcining the product at a temperature ranging from 300° to 800° C.

In the present invention, the amount of antimony (expressed in terms of the amount of $Sb_2O_3$) to be added as a dopant ranges from 1 to 15% by weight and preferably 2 to 12% by weight on the basis of the weight of the tin oxide. This is because if it is less than 1% by weight, the electrical conductivity of the resulting filler is insufficient, while if it exceeds 15% by weight, the resulting electrically-conductive filler is colored dark blue.

The fibrous electrically-conductive filler of the present invention exhibits various effects such as those detailed below:

(1) The fibrous electrically-conductive filler per se is highly electrically-conductive and shows an excellent electrical conductivity-imparting effect even when it is incorporated into a basic material such as a resin, a rubber or a paint in a small amount.

(2) If a titanium oxide film is applied as an intermediate layer, a electrically-conductive film having a high strength can be formed and, therefore, the electrically-conductive layer cannot be peeled off and hence impaired by any mechanical action such as frictional action encountered in incorporating it into a basic material.

(3) The fibrous electrically-conductive filler is white or transparent depending on the coated amount of titanium oxide and thus products having any color tone can be obtained by simultaneously incorporating the filler of the invention and an organic or inorganic coloring material.

(4) The filler of the invention is in the form of fibers and has high strength, high elastic modulus and good heat resistance. Therefore, it also serves as a reinforcing additive.

The present invention will hereinafter be explained in more detail with reference to the following non-limitative working Examples and the effect practically attained by the invention will also be discussed in detail in comparison with Reference Examples.

EXAMPLE 1

There was dispersed 100 g of fibrous aluminum borate (Alborex G; available from Shikoku Chemicals Corp.) in 1500 ml of water to form a slurry, the resulting slurry was heated up to 40° C. under stirring with a stirring machine, followed by the addition of 65.38 g of a solution of titanyl sulfate (containing 24% of Ti($SO_4$)$_2$) to the slurry, heating of the slurry up to 90° C. and continuous stirring thereof for 60 minutes. Then the slurry was filtered, washed, dried and calcined at 500° C. for 2 hours to give titanium oxide-coated fibrous aluminum borate.

The resulting titanium oxide-coated fibrous aluminum borate (100 g) was dispersed in 1500 ml of water to give a slurry, the slurry was heated up to 75° C., then an aqueous solution of 81.09 g of sodium stannate (containing 96% of $Na_2SnO_3$) in 500 ml of water was added to the slurry, followed by stirring for 30 minutes and addition of a 20% sulfuric acid solution over 90 minutes to adjust the pH thereof to 2.5. Thereafter, the slurry was maintained at a pH of 2.5 and a temperature of 75° C. followed by the simultaneous adition of 300 ml of an aqueous solution of 8.32 g of antimony chloride in dilute hydrochloric acid (containing 98% of $SbCl_3$) and a 25% sodium hydroxide solution over 3 hours. After completion of the addition, the slurry was ripened for 3 hours while maintaining the pH and temperature thereof at 2.5° and 75° C. respectively, followed by filtration, washing, drying and calcination at 600° C. for 2 hours in air to give a white fibrous electrically-conductive filler according to the present invention. It was found that the white fibrous electrically-conductive filler comprised 3.5% by weight of antimony (in terms of the amount of $Sb_2O_3$) and 29.5% by weight of tin (in terms of the amount of $SnO_2$). Further, the white fibrous electrically-conductive filler was observed by a scanning electron microscope and as a result, it was found that the electrically-conductive layer uniformly covered the surface of the fibrous aluminum borate and that the filler did not comprise any free electrically-conductive substance. The volume specific resistivity thereof was found to be $4 \times 10^1 \ \Omega \cdot cm$.

EXAMPLE 2

The same procedures used in Example 1 were repeated except that the amounts of sodium stannate and antimony chloride were changed to 41.16 g and 4.22 g respectively to thus give a white fibrous electrically-conductive filler according to the present invention. It was found that the white fibrous electrically-conductive filler comprised 2.1% by weight of antimony (in terms of the amount of $Sb_2O_3$) and 17.9% by weight of tin (in terms of conductive filler was examined by a scanning electron microscope and as a result, it was found that the electrically-conductive layer uniformly covered the surface of the fibrous aluminum borate and that the filler did not comprise any free electrically-conductive substance. The volume specific resistivity thereof was found to be $6 \times 10^2 \ \Omega \cdot cm$.

EXAMPLE 3

In the same manner used in Example 1, titanium oxide-coated fibrous aluminum borate (100 g) was dispersed in 1500 ml of water to give a slurry, followed by addition of 400 ml of an ethanolic solution containing 70.08 g of tin(IV) chloride (containing 98% of $SnCl_4$) and 5.98 g of antimony chloride (containing 98% of $SbCl_3$) over 2 hours to thus deposit and form a coating layer of tin oxide containing antimony on the surface of the titanium oxide-coated fibrous aluminum borate, filtration, washing, drying and calcination at 600° C. for 2 hours in air to give a white fibrous electrically-conductive filler according to the present invention. It was found that the white fibrous electrically-conductive filler comprised 2.6% by weight of antimony (in terms of the amount of $Sb_2O_3$) and 27.4% by weight of tin (in terms of the amount of $SnO_2$). Further, the white fibrous electrically-conductive filler was observed by a scanning electron microscope and as a result, it was found that the electrically-conductive layer uniformly covered the surface of the fibrous aluminum borate and that the filler did not comprise any free electrically-conductive substance. The volume specific resistivity thereof was found to be $1.8 \times 10^3 \ \Omega \cdot cm$.

EXAMPLE 4

The same procedures used in Example 2 were repeated except that untreated fibrous aluminum borate was substituted for the titanium oxide-coated aluminum borate used in Example 2 to give white fibrous electrically-conductive filler according to the present invention. It was found that the white fibrous electrically-conductive filler comprised 2.1% by weight of antimony (in terms of the amount of $Sb_2O_3$) and 17.9% by weight of tin (in terms of the amount of $SnO_2$). Further, the white fibrous electrically-conductive filler was observed by a scanning electron microscope and as a result, it was found that the electrically-conductive layer uniformly covered the surface of the fibrous aluminum borate and that the filler did not comprise any free electrically-conductive substance. The volume specific resistivity thereof was found to be $1.8 \times 10^3 \ \Omega \cdot cm$.

EXAMPLE 5

There was dispersed 100 g of fibrous aluminum borate (Alborex G; available from Shikoku Chemicals Corp.) in 1000 ml of water to form a slurry, the resulting slurry was heated up to 70° C. under stirring with a stirring machine and hydrochloric acid was added to the slurry to control the pH thereof to 2. Then a solution of 2.50 g of tin(IV) chloride in hydrochloric acid (containing 98% of $SnCl_4$) was added to the slurry followed by stirring of the slurry for 60 minutes to give a slurry having a pH of 1.5. Then 500 ml of a solution obtained by dissolving 78.04 g of tin(IV) chloride in a sodium hydroxide solution (containing 98% of $SnCl_4$) was added to the slurry followed by stirring at 70° C. for 30 minutes. Then a 2 mole/l hydrochloric acid solution was added over 90 minutes to control the pH of the slurry to 2.5. Thereafter, 300 ml of an aqueous solution obtained by dissolving 8.32 g of antimony chloride in a dilute hydrochloric acid solution (containing 98% of $SbCl_3$) and a 10% sodium hydroxide solution were simultaneously added to the slurry over 5 hours while maintaining the pH and temperature at 2.5 and 75° C. respectively with stirring. After completion of the addition, the slurry was ripened for 5 hours while maintaining the pH and temperature at 2.5° and 75° C. respectively, followed by filtration, washing, drying and calcination at 600° C. for 2 hours in air to give white fibrous electrically-conductive filler according to the present invention. It was found that the white fibrous electrically-conductive filler comprised 3.5% by weight of antimony (in terms of the amount of $Sb_2O_3$) and 29.5% by weight of tin (in terms of the amount of $SnO_2$). Further, the white fibrous electrically-conductive filler was observed by a scanning electron microscope and as a result, it was found that the electrically-conductive layer uniformly covered the surface of the fibrous aluminum borate and that the filler did not comprise any free electrically-conductive substance. The volume specific resistivity thereof was found to be $1 \times 10^2 \, \Omega \cdot cm$.

REFERENCE EXAMPLE

A paint was prepared by incorporating, into a polyester resin, the fibrous electrically-conductive filler obtained in Example 1 (volume specific resistivity: $4 \times 10^{-1} \, \Omega \cdot cm$), commercially available electrically-conductive tin oxide powder (volume specific resistivity: $2 \times 10^0 \, \Omega \cdot cm$), electrically-conductive zinc oxide powder (volume specific resistivity: $2 \times 10^0 \, \Omega \cdot cm$), needle-like electrically-conductive titanium oxide (volume specific resistivity: $1.3 \times 10^1 \, \Omega \cdot cm$) or electrically-conductive alkali metal titanate fibers (volume specific resistivity: $7.9 \times 10^0 \, \Omega \cdot cm$) in a formulation as listed in the following Table 1. The resulting paint was uniformly applied onto the surface of a polyester film with an applicator of 50μm, then dried and the surface resistance of the resulting film was determined by a resistance measuring device available from Mitsubishi Jushi Engineering Co., Ltd. In addition, the transparency of the coated film was determined, in terms of entire light ray-transmittance, by a turbidimeter available from Nippon Denshoku Kogyo K.K. The results obtained are summarized in Table 1.

TABLE 1

| PWC (%) | 20 | 25 | 30 | 40 |
|---|---|---|---|---|
| Present Invention (Example 1) | | | | |
| Surface Resistance | $7 \times 10^5$ | $1 \times 10^5$ | $3 \times 10^4$ | $1 \times 10^4$ |
| Entire Light Ray-Transmittance | 95.8 | 94.8 | 93.8 | 79.9 |
| Present Invention (Example 5) | | | | |
| Surface Resistance | $1 \times 10^6$ | $3 \times 10^5$ | $6 \times 10^4$ | $3 \times 10^4$ |
| Entire Light Ray-Transmittance | 97.0 | 95.0 | 94.0 | 85.0 |
| Electrically-conductive Tin Oxide | | | | |
| Surface Resistance | $10^{10}<$ | $10^{10}<$ | $10^{10}<$ | $10^{10}<$ |
| Entire Light Ray-Transmittance | 97.0 | 95.3 | 90.2 | 86.0 |
| Electrically-conductive Zinc Oxide | | | | |
| Surface Resistance | $10^{10}<$ | $10^{10}<$ | $10^{10}<$ | $10^{10}<$ |
| Entire Light Ray-Transmittance | — | — | — | — |
| Electrically-conductive Titanium Oxide Needles | | | | |
| Surface Resistance | — | $3 \times 10^7$ | $2 \times 10^6$ | $3 \times 10^5$ |
| Entire Light-Ray Transmittance | — | 28.4 | 23.6 | 27.3 |
| Electrically-conductive Potassium Titanate Fiber | | | | |
| Surface Resistance | $4 \times 10^6$ | $1 \times 10^6$ | $4 \times 10^5$ | $8 \times 10^4$ |
| Entire Light Ray-Transmittance | 42.1 | 30.7 | 23.9 | 34.2 |

PWC (%) = [weight of filler/(weight of filler + weight of resin)] × 100;
Surface Resistance = $\Omega/\square$;
Entire Light Ray-Transmittance = %.

As will be seen from Table 1, the fibrous electrically-conductive filler according to the present invention is excellent in electrical conductivity-imparting effect as compared with other powdery electrically-conductive substances or fibrous electrically-conductive fillers even if it is used in a small amount.

Moreover, the electrically-conductive filler of the present ivention can provide a transparent electrically-conductive film when it is used in a electrically-conductive paint. Thus, the electrically-conductive filler according to the present invention is substantially excellent as compared with other conventionally known electrically-conductive fillers.

What is claimed is:

1. A fibrous electrically-conductive filler comprising fibrous aluminum borate as a core material and a layer of an electrically-conductive substance which covers the surface of the core material, wherein the layer of electrically-conductive substance comprises a layer of a tin oxide compound doped with antimony or fluorine in an amount sufficient to provide electrical conductivity without discoloration.

2. The fibrous electrically-conductive filler of claim 1 wherein the fibrous aluminum borate has an average fiber length ranging from 10 to 30 μm and an average diameter of the fiber ranging from 0.5 to 1 μm and has a chemical composition represented by the formula: $9Al_2O_3 \cdot 2B_2O_3$ or $2Al_2O_3 \cdot B_2O_3$.

3. The fibrous electrically-conductive filler of claim 1 wherein the dopant is antimony and the amount thereof expressed in terms of the amount of $Sb_2O_3$ ranges from 1 to 15% by weight on the basis of the tin oxide.

4. The fibrous electrically-conductive filler of claim 3 wherein the amount thereof expressed in terms of the amount of $Sb_2O_3$ ranges from 2 of 12% by weight on the basis of the tin oxide.

5. A fibrous electrically-conductive filler of claim 1 a layer of titanium oxide between the fibrous aluminum borate and the layer of an electrically-conductive substance, wherein the amount of titanium oxide coated on the fibrous aluminum borate ranges from 2 to 50% by weight on the basis of the weight of the fibrous aluminum borate.

6. The fibrous electrically-conductive filler of claim 5 wherein the fibrous aluminum borate has an average fiber length ranging from 10 to 30 μm and an average diameter of the fiber ranging from 0.5 to 1 μm and has a chemical composition represented by the formula: $9Al_2O_3 \cdot 2B_2O_3$ or $2Al_2O_3 \cdot B_2O_3$.

7. The fibrous electrically-conductive filler of claim 5 wherein the dopant is antimony and the amount thereof expressed in terms of the amount of $Sb_2O_3$ ranges from 1 to 15% by weight on the basis of the tin oxide.

8. The fibrous electrically-conductive filler of claim 7 wherein the amount thereof expressed in terms of the amount of $Sb_2O_3$ ranges from 2 to 12% by weight on the basis of the tin oxide.

* * * * *